US011727077B2

(12) United States Patent
Alonichau et al.

(10) Patent No.: US 11,727,077 B2
(45) Date of Patent: Aug. 15, 2023

(54) INFERRING INFORMATION ABOUT A WEBPAGE BASED UPON A UNIFORM RESOURCE LOCATOR OF THE WEBPAGE

(71) Applicant: Microsoft Technology Licensing, LLC, Redmond, WA (US)

(72) Inventors: Siarhei Alonichau, Seattle, WA (US); Aliaksei Bondarionok, Redmond, WA (US); Junaid Ahmed, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 140 days.

(21) Appl. No.: 17/168,665

(22) Filed: Feb. 5, 2021

(65) Prior Publication Data
US 2022/0253502 A1    Aug. 11, 2022

(51) Int. Cl.
*G06F 16/00* (2019.01)
*G06F 16/955* (2019.01)
*G06F 16/906* (2019.01)
*G06F 16/951* (2019.01)
*G06F 16/9538* (2019.01)
*G06F 40/284* (2020.01)
*G06F 40/30* (2020.01)

(52) U.S. Cl.
CPC ........ *G06F 16/9566* (2019.01); *G06F 16/906* (2019.01); *G06F 16/951* (2019.01); *G06F 16/9538* (2019.01); *G06F 40/284* (2020.01); *G06F 40/30* (2020.01)

(58) Field of Classification Search
CPC .. G06F 16/9566; G06F 40/284; G06F 16/906; G06F 16/951; G06F 16/9538; G06F 40/30
See application file for complete search history.

(56) References Cited

U.S. PATENT DOCUMENTS 5,721,939 A    2/1998  Kaplan
6,990,442 B1   1/2006  Davis
(Continued)

FOREIGN PATENT DOCUMENTS

CN    111198995 A   *   5/2020
GB      2528030 A   *   1/2016    ....... G06F 17/30861

OTHER PUBLICATIONS

"Web Crawler—Wikipedia", Retrieved from: https://en.wikipedia.org/w/index.php?title=Web_crawler&oldid=484793229, Mar. 31, 2012, 2 Pages.
(Continued)

*Primary Examiner* — Leslie Wong
(74) *Attorney, Agent, or Firm* — Calfee, Halter & Griswold LLP

(57) ABSTRACT

Described herein are technologies related to inferring information about a webpage based upon semantics of a uniform resource location (URL) of the webpage. The URL is tokenized to create a sequence of tokens. An embedding for the URL is generated based upon the sequence of tokens, wherein the embedding is representative of semantics of the URL. Based upon the embedding for the URL, information about the webpage pointed to by the URL is inferred, the webpage is retrieved, and information is extracted from the webpage based upon the information inferred about the webpage.

20 Claims, 7 Drawing Sheets

(56) References Cited

U.S. PATENT DOCUMENTS

| | | | | |
|---|---|---|---|---|
| 7,693,827 | B2* | 4/2010 | Zamir | H04L 67/535 |
| | | | | 707/999.003 |
| 7,937,263 | B2 | 5/2011 | Carrier et al. | |
| 8,938,408 | B1* | 1/2015 | Serdyukov | G06N 20/00 |
| | | | | 707/738 |
| 11,200,288 | B1* | 12/2021 | Baker | G06F 16/24578 |
| 11,277,443 | B2* | 3/2022 | Onut | H04L 63/0227 |
| 11,294,974 | B1* | 4/2022 | Shukla | G06F 16/90335 |
| 2003/0149562 | A1 | 8/2003 | Walther | |
| 2006/0064411 | A1* | 3/2006 | Gross | G06F 16/951 |
| 2008/0071802 | A1 | 3/2008 | Lucco et al. | |
| 2008/0208566 | A1 | 8/2008 | Alonichau | |
| 2008/0301139 | A1* | 12/2008 | Wang | G06F 16/9566 |
| | | | | 709/224 |
| 2009/0024583 | A1 | 1/2009 | Jaiswal et al. | |
| 2010/0023318 | A1 | 1/2010 | Lemoine | |
| 2010/0161313 | A1 | 6/2010 | Karttunen | |
| 2011/0119268 | A1* | 5/2011 | Rajaram | G06F 16/9566 |
| | | | | 707/E17.112 |
| 2011/0208730 | A1* | 8/2011 | Jiang | G06F 16/951 |
| | | | | 707/738 |
| 2011/0276577 | A1 | 11/2011 | Yao et al. | |
| 2014/0095495 | A1* | 4/2014 | Brukman | G06F 16/24575 |
| | | | | 707/732 |
| 2014/0358911 | A1* | 12/2014 | McCarthy | G06F 16/9535 |
| | | | | 707/723 |
| 2018/0246899 | A1* | 8/2018 | Natchu | G06F 16/93 |
| 2018/0253496 | A1* | 9/2018 | Natchu | G06F 16/951 |
| 2019/0287685 | A1 | 9/2019 | Wu et al. | |
| 2019/0347668 | A1* | 11/2019 | Williams | G06N 5/046 |
| 2020/0213336 | A1* | 7/2020 | Yu | G06N 3/08 |
| 2021/0027114 | A1 | 1/2021 | Lee et al. | |
| 2021/0202045 | A1* | 7/2021 | Neumann | G06F 16/951 |
| 2021/0374347 | A1 | 12/2021 | Yang et al. | |
| 2022/0107802 | A1* | 4/2022 | Rao | G06F 16/907 |
| 2022/0164535 | A1 | 5/2022 | Berns et al. | |
| 2022/0284190 | A1 | 9/2022 | Alonichau et al. | |

OTHER PUBLICATIONS

Cho, et al., "Efficient Crawling through URL Ordering", In Journal of Computer Networks and ISDN Systems, vol. 30, Apr. 1998, 20 Pages.

"International Search Report and Written Opinion Issued in PCT Application No. PCT/US22/013033", dated Mar. 25, 2022, 10 Pages.

Alonichau, Sergei, "How to Train Better Language Detection with Bling Fire and FastText", Retrieved From https://github.com/microsoft/BlingFire/wiki/How-to-train-better-language-detection-with-Bling-Fire-and-FastText, Retrieved on Nov. 28, 2020, 5 Pages.

Alonichau, Sergei, "Microsoft / BlingFire", Retrieved From https://github.com/Microsoft/BlingFire, Nov. 7, 2020, 10 Pages.

Kudo, Taku, "Google / Sentencepiece", Retrieved From https://github.com/google/sentencepiece, Retrieved on Nov. 28, 2020, 9 Pages.

Wu, et al., "Google's Neural Machine Translation System: Bridging the Gap Between Human and Machine Translation", In Repository of arXiv: 1609.08144v2, Sep. 26, 2016, 23 Pages.

"Non-Final Office Action Issued in U.S. Appl. No. 17/190,344", dated Feb. 3, 2023, 15 Pages.

* cited by examiner

HTTP://WWW.EXAMPLE.COM/PRDCTTYPE/NEWITM/PRODUCT.HTML

| TOKENS | TOKEN IDENTIFIERS | BIGRAMS | BIGRAM IDENTIFIERS |
|---|---|---|---|
| HTTP://WWW. | 5 | HTTP://WWW.EXAMPLE | 250623 |
| EXAMPLE | 25 | EXAMPLE.COM/ | 1345832 |
| .COM/ | 676 | .COM/PRDCT | 765231 |
| PRDCT | 2567 | PRDCTTYPE | 361232 |
| TYPE | 10876 | TYPE/ | 1635762 |
| / | 356 | /NEW | 678356 |
| NEW | 12567 | NEWITM | 888265 |
| ITM | 165789 | ITM/ | 1234567 |
| / | 356 | /PRODUCT | 299676 |
| PRODUCT | 25674 | PRODUCT.HTML | 566763 |
| .HTML | 213584 | .HTMLNULL | 986998 |

INFERRING INFORMATION ABOUT A WEBPAGE BASED UPON A UNIFORM RESOURCE LOCATOR OF THE WEBPAGE

BACKGROUND

A computer-implemented search engine is configured to receive a query from a client computing device and return search results that represent documents (e.g., webpages, images, videos, etc.) to the client computing device, where the documents corresponding to the search results have been identified by the search engine as being relevant to the query. With more specificity, when the search engine receives the query, the search engine searches over a computer-readable search engine index based upon the query, where the search engine index includes entries corresponding to webpages that have been previously crawled by a web crawler of the search engine. The search engine identifies webpages indexed in the search engine index based upon the query, and the search engine then ranks the identified webpages based upon several features of the webpages and/or the query, such as static scores assigned to the webpages, numbers of inbound and outbound links in the webpages, whether words in the query match words in the titles of the webpages, amongst numerous other features. The search engine then returns a search engine results page (SERP) to the client computing device, where, for example, the SERP includes ten search results that represent the ten webpages most highly ranked by the search engine.

A search engine index for a general-purpose search engine includes several billions of entries that represent hundreds of millions to billions of webpages that are available on the World Wide Web. There are, however, an even larger number of webpages that exist; therefore, it can be ascertained that a huge number of webpages are not represented in the search engine index, where a webpage is not represented in the search engine index either because: 1) the search engine is unaware of the existence of the webpage; or 2) the search engine has deemed the webpage as being unworthy of representation in the search engine index (e.g., the webpage includes content that is not relevant to users of the search engine, the webpage includes malicious content, etc.).

Conventionally, when the search engine is aware of a webpage but does not index the webpage, the search engine must nevertheless retrieve the webpage and analyze its content prior to determining to refrain from indexing the webpage, which consumes finite resources of the search engine. Alternatively, the search engine determines to refrain from indexing the webpage based upon somewhat arbitrary features that are known about the webpage (such as the identity of a website to which the webpage belongs, a number of known inbound links to the webpage, etc.). It can be ascertained, however, that the number of inbound links to the webpage is not indicative of content of the webpage. Thus, there is currently no robust approach for identifying which webpages are sufficiently "important" to include in the search engine index without retrieving and analyzing content of the webpage.

SUMMARY

The following is a brief summary of subject matter that is described in greater detail herein. This summary is not intended to be limiting as to the scope of the claims.

Described herein are various technologies pertaining to inferring information about a webpage based upon alphanumerical characters in a uniform resource locator (URL) that points to the webpage. The inferred information can be, but is not limited to: 1) a likelihood that an arbitrary user of a search engine will select a search result that represents the webpage if the webpage were presented to the arbitrary user on a search engine results page (SERP); 2) a likelihood that content of the webpage pertains to a particular topic; 3) a likelihood that the webpage, when retrieved by a client computing device, will cause the client computing device to install malware thereon; 4) a likelihood that content of the webpage has been updated within some threshold amount of time; 5) a likelihood that content in the webpage is written in a particular language; 6) a likelihood that the webpage has a threshold number of outbound links; 7) a likelihood that the webpage is able to be accessed by a user (e.g., the webpage is a permission-based page and/or is region-locked); and/or 8) a likelihood that a crawler will be able to successfully crawl the webpage.

In connection with inferring the information about the webpage, a search engine identifies the URL for the webpage, where the webpage is not represented in a search engine index of the search engine. The search engine acquires semantic information in the URL and uses that semantic information to infer the information about the webpage. With more specificity, the URL is provided to a tokenizer that tokenizes the URL, thereby forming a sequence of tokens. In an example, the tokenizer is learned based upon identified alphanumerical patterns in a large number of URLs for webpages known by the search engine to be in existence (e.g., billions to trillions of webpages), such that the learned tokenizer searches for the patterns in the URL and tokenizes the URL based upon the patterns.

Upon the URL being tokenized, the tokens can be mapped to respective identifiers. For instance, for the URL http://www.example.com, the tokenizer may tokenize such URL into tokens "http://", "www.", "example", and ".com", and map these tokens to four respective token identifiers. Optionally, the tokenizer forms n-grams from the tokens and maps the n-grams to respective identifiers (where the n-gram identifiers do not overlap with the token identifiers), where n may be 2, 3, 4, 5, etc. Therefore, continuing with this example and where the n-gram is a bigram, the tokenizer forms bigrams "http://www.", "www.example", "example-.com", and ".comnull", and maps the bigrams to four respective bigram identifiers. The tokenizer, then, outputs identifiers that represent the URL, where the identifiers include a sequence of token identifiers and a sequence of n-gram identifiers.

Word embedding is performed upon the sequence of identifiers, such that each identifier (and therefore each token output by the tokenizer and each n-gram output by the tokenizer) is represented as an s-dimensional vector. Accordingly, the URL is represented by a sequence of s-dimensional vectors, with each s-dimensional vector encoding semantic information about the token or n-gram represented by the s-dimensional vector.

An embedding for the URL is generated based upon the sequence of s-dimensional vectors, where any suitable approach can be employed to generate the embedding for the URL. For instance, values in the s-dimensional vectors are averaged to form an embedding for the URL. In another example, a recurrent neural network (RNN) is provided with the s-dimensional vectors and is configured to output the embedding for the URL. Other embodiments are also contemplated. The vector for the URL is provided to a classifier, where, in an example, the classifier is configured to output a score that is indicative of a likelihood that a search result representing the webpage would be clicked by an arbitrary user if the search result were included in a SERP returned to the arbitrary user. When such score is above a threshold (or alternatively, within some top threshold number of scores output by the classifier), the webpage pointed to by the URL is retrieved, information is extracted from the webpage, and an entry in a search engine index is created for the webpage based upon the information extracted from the webpage. In this way, compute resources are saved by not retrieving, and extracting from, webpages that don't have a sufficient score.

The classifier is trained based upon a relatively large number of training items identified from a search log of a search engine and/or from a list of URLs for webpages known to exist but not represented in the search engine index. Each training item is a pair that includes a URL and a value that indicates whether a search result corresponding to the URL was clicked by one or more search engine users. Therefore, for instance, the pair <URL1, 1> is a positive training item, where a search result corresponding to URL1 was selected by one or more users of the search engine, while the pair <URL2,0> is a negative training items, where a search result corresponding to URL2 was not selected by one or more users of the search engine. In an example training set, the training items include an approximately equivalent number of positive and negative training items.

The tokenizer outputs identifiers for URLs in the training items, and URL embeddings are generated for the URLs (as described above). The classifier is trained based upon the URL embeddings that represent the URLs and the corresponding values from the training pairs, where any suitable training technique can be employed to train the classifier. Hence, when the classifier receives a previously unseen embedding that represents a URL, the classifier outputs a score that is indicative of likelihood that a search result corresponding to the URL will be selected by an arbitrary user when included in a SERP returned to the arbitrary user. The classifier outputs this likelihood based upon the URL and does not require the webpage pointed to by the URL to be retrieved to compute the score.

As indicated previously, the technologies described herein are not limited to computing a score that is indicative of a likelihood that a search result will be selected based upon a URL that corresponds to the search result. In other examples, the classifier is trained to output a score that is indicative of a likelihood that the webpage pointed to by the URL includes content pertaining to a particular topic (or topics), the classifier is trained to output a score that is indicative of a likelihood that the webpage will cause malware to be installed on a client computing device that retrieves the webpage, the classifier is trained to output a score that is indicative of a likelihood that the webpage pointed to by the URL includes some threshold number of outbound links, etc.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
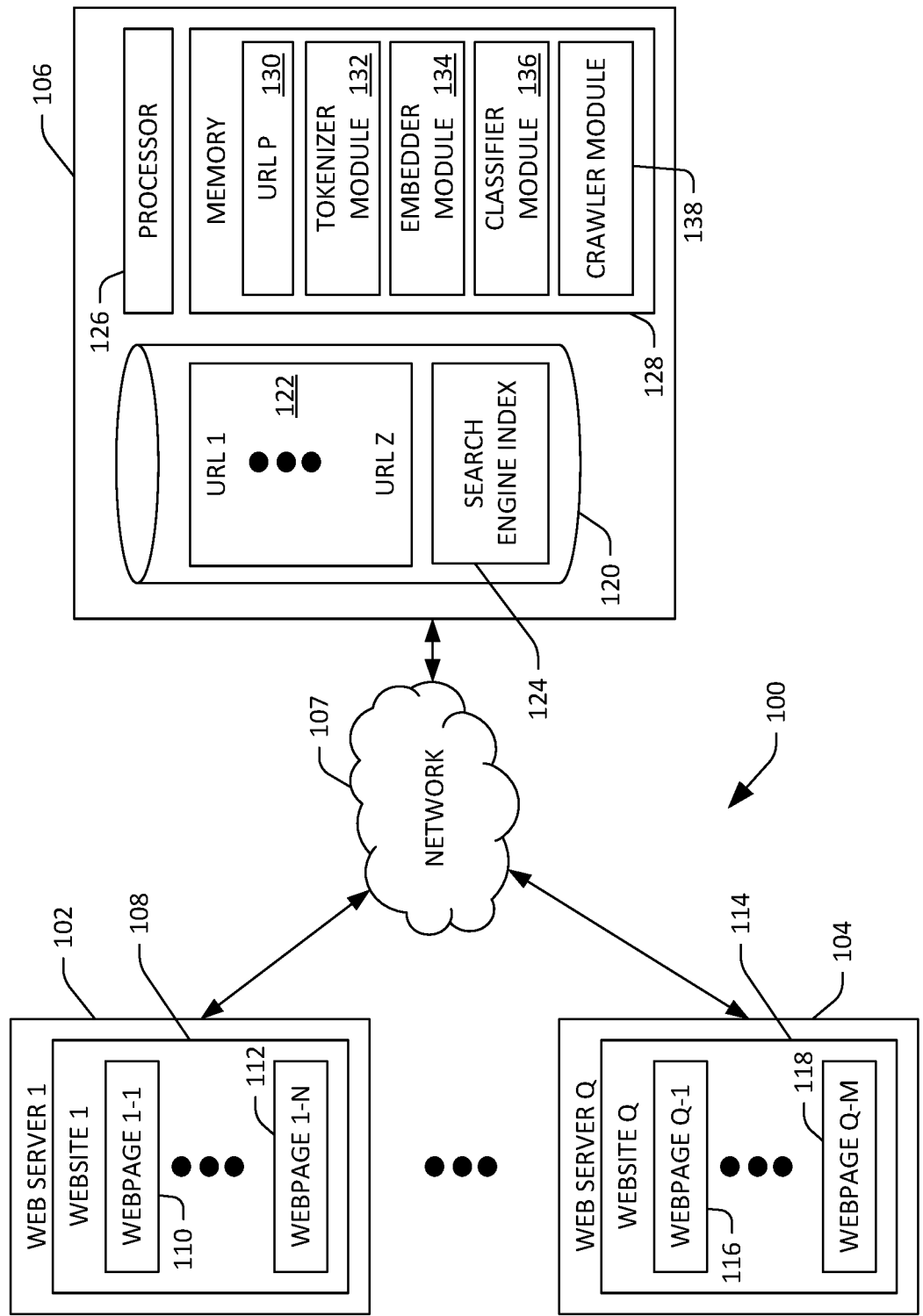
FIG. 1 is a functional block diagram of an exemplary computing system that is configured to update a search engine index to include an entry for a webpage based upon a score that is computed for the webpage that is indicative of an "importance" of the webpage.

Various technologies pertaining to inferring information about a webpage based upon a uniform resource locator (URL) of the webpage are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Described herein are various technologies pertaining to inferring information about a webpage based upon the URL of the webpage. Information that can be inferred about the webpage includes, but is not limited to: 1) a likelihood that a search result that represents the webpage will be selected upon by an arbitrary user of a search engine when the search engine returns the search result as part of a search engine results page (SERP) to the arbitrary user; 2) a likelihood that the webpage includes content that pertains to a particular topic or topics; 3) a likelihood that the webpage includes a threshold number of outbound links to other documents; 4) a likelihood that the webpage page will cause malware to be installed on a client computing device when the client computing device retrieves the webpage; 5) a likelihood that content of the webpage has altered within some threshold amount of time (e.g., within the last two weeks); 6) a likelihood that content of the webpage is written in a particular language; 7) a likelihood that a crawler will be able to successfully crawl the webpage; and/or 8) a likelihood that the webpage is accessible to end users (e.g., the webpage requires permissions, the webpage is only available for certain geographic regions, etc.). As will be described in detail below, information about the webpage is inferred based upon semantic understanding of the URL of the webpage, where the URL is tokenized to generate tokens and an embedding for the URL is generated based upon such tokens, where the embedding represents semantics of the URL of the webpage.

There are numerous advantages associated with the technologies described herein. These advantages include saving of compute resources compared to conventional technologies, as the search engine can save compute resources by determining not to crawl and/or index "junk" webpages based upon information about such webpages that is inferred based upon the URLs of the webpages. The technologies also are associated with an improved search engine index, as a determination as to whether to include an entry for a webpage in the search engine index is made based upon semantic information extracted from the URL of the webpage. Moreover, as the search engine index fails to include an entry for a "junk" webpage, computer-readable storage required to store the index is reduced, and search results may be returned more quickly as the search engine need not contemplate entries for "junk" webpages. Other advantages will be appreciated.

With reference now to FIG. 1, a functional block diagram of a system 100 is presented, where the system 100 is configured to update a search engine index to include an entry for a webpage that is available by way of the Internet based upon information that is inferred about the webpage, and further where the information is inferred based upon the URL of the webpage. The system 100 includes several web servers 102-104 and a computing system 106 that is in communication with the web servers 102-104 by way of a network 107. The web servers 102-104 host respective websites, where each of the websites hosted by the web servers 102-104 includes at least one webpage. As illustrated in FIG. 1, the first web server 102 hosts a first website 108, where the first website 108 includes N webpages 110-112. The Qth web server 104 hosts a Qth website 114, where the Qth website 114 includes M webpages 116-118. While each of the web servers 102-104 is illustrated as hosting a single website, it is to be understood that one or more of the web servers 102-104 may host multiple websites. Additionally, while the websites 108 and 114 are illustrated as including several webpages, one or more of the websites 108 and 114 may include a single webpage. The webpages 110-112 and 116-118 have URLs assigned thereto that point to locations where the webpages 110-112 and 116-118 can be retrieved.

The computing system 106 is included in computing systems that implement a search engine. To that end, the computing system 106 includes a computer-readable data store 120 that retains a list of URLs 122, where each URL in the list of URLs 122 points to a webpage that is retrievable by way of the Internet. The data store further includes a search engine index 124, where the search engine index 124 includes entries for respective webpages that have been crawled by a crawler of the search engine. In an example, the URLs in the list of URLs 122 correspond to webpages that the search engine is aware of but for which there are no entries in the search engine index 124. The websites 108 and 114 may be relatively new websites, where sitemaps for the websites 108 and 114 have been submitted to the computing system 106 but the search engine has yet to crawl the webpages 110-112 and 116-118 of the websites 108 and 114, respectively. The sitemaps include URLs of the webpages 110-112 and 116-118, and therefore the listing of URLs 122 includes the URLs of the webpages 110-112 and 116-118.

The technologies described herein relate to inferring information about the webpages 110-112 and 116-118 based upon their respective URLs, without requiring retrieval of the webpages 110-112 and 116-118 from the web servers 102-104 to analyze content of the webpages 110-112 and 116-118. As will be described in greater detail below, information about a webpage can be inferred based upon semantic information in the URL that is extracted from the URL by the computing system 106.

The computing system 106 includes a processor 126 and memory 128 that includes data that is retrieved by the processor 126 and instructions that are executed by the processor 126. The memory 128 has a Pth URL 130 loaded therein, where the Pth URL 130 was retrieved from the list of URLs 122 in the data store 120. In an example, the Pth URL 130 is the URL of the first webpage 110 of the first website 108 hosted by the first web server 102. The memory 128 further includes a tokenizer module 132 that is configured to tokenize URLs, such that the tokenizer module 132 breaks a received URL into a sequence of tokens. The memory 128 also includes an embedder module 134 that is configured to generate embeddings for URLs based upon tokens generated by the tokenizer module 132. The embeddings represent semantics of the URL tokenized by the tokenizer module 132.

The memory 128 also includes a classifier module 136 that is configured to receive embeddings for URLs output by the embedder module 134 and compute scores based upon the embeddings. In an embodiment, a score computed by the embedder module 134 is indicative of a likelihood that an arbitrary user of the search engine will select a search result corresponding to the URL if the search result were included in SERP returned by the search engine. Finally, the memory 128 includes a crawler module 138 that is configured to crawl a webpage when a score output by the classifier module 136 for a URL of the webpage exceeds a threshold (or when the score is amongst a top threshold number of scores).

Operation of the tokenizer module 132, the embedder module 134, the classifier module 136, and the crawler module 138 is now described with respect to the Pth URL 130. The tokenizer module 132 receives the Pth URL 130, parses the Pth URL 130, and breaks the Pth URL 130 into a sequence of tokens. In an example, the tokenizer module 132 is trained to identify some predefined number of different tokens (e.g., 250,000 potential tokens), and parses the Pth URL 130 in search of such tokens. Upon tokenizing the Pth URL, the tokenizer module 132 maps the tokens to predefined (numerical) token identifiers. Thus, the tokenizer module 132 transforms the sequence of tokens extracted from the Pth URL 130 into a sequence of token identifiers. Optionally, the tokenizer module 132 forms a sequence of n-grams (e.g., bigrams, trigrams, four-grams, etc.) and maps each n-gram into one of a predefined number of n-gram identifiers. In a specific example, the tokenizer module 132 forms a sequence of bigrams from the sequence of tokens and hashes each bigram into one of 150 million bigram identifiers. Therefore, the tokenizer module 132 transforms the Pth URL 130 into several identifiers, where the identifiers include a sequence of token identifiers and a sequence of n-gram identifiers.

The embedder module 134 performs word embedding on each identifier in the sequence of identifiers output by the tokenizer module 132. Specifically, for each identifier output by the tokenizer module 132, the embedder module 134 generates an s-dimensional vector, where distance between two s dimensional vectors represents semantic similarity between tokens and/or n-grams that are represented by the s-dimensional vectors. Pursuant to an example, s is two, three, four, or five. The embedder module 134 thus generates a sequence of s-dimensional vectors, with each s-dimensional vector representing semantic information for a token or n-gram in the Pth URL 130.

The embedder module 134 constructs an embedding for the Pth URL based upon the sequence of s-dimensional vectors (e.g., the embedder module 134 "combines" the sequence of s-dimensional vectors into an embedding for the Pth URL 130). The embedder module 134 can utilize any suitable approach for generating the embedding for the Pth URL, including computing mean values for entries in the s-dimensional vector, providing the s-dimensional vectors to a recurrent neural network (RNN) that is trained to generate embeddings for URLs based upon sequences of s-dimensional vectors, providing the s-dimensional vectors to a Bi-RNN with an attention mechanism, where the Bi-RNN is trained to generate embeddings for URLs based upon sequences of s-dimensional vectors, providing the sequence of s-dimensional vectors to a transformer that is configured to output embeddings for URLs, etc. The embedding for the Pth URL output by the embedder module 134 represents semantics of the Pth URL.

The classifier module 136 receives the embedding for the Pth URL output by the embedder module 134 and computes a score based upon the embedding, where the score is indicative of a likelihood that a search result that represents the first webpage 110 would be selected by an arbitrary user of the search engine if the search result were included a SERP that was returned to the arbitrary user. Put differently, the classifier module 136, upon receipt of the output of the embedder module 134 ascertains whether semantics of Pth URL are closer to: 1) semantics of URLs whose webpages have been selected by users of the search engine; or 2) semantics of URLs whose webpages have not been selected by users of the search engine.

As will be described in greater detail below, the classifier module 136 is trained based upon several positive and negative training items, where positive training items include URLs of webpages that have been selected by users (as noted in a search engine log of the search engine) and negative training items include URLs of webpages that have not been selected by users of the search engine. When the classifier module 136 is trained, the tokenizer module 132 receives URLs in the positive and negative training items and outputs identifiers based upon tokens extracted from the URLs, the embedder module receives the identifiers and outputs embeddings for the URLs as described above, and the classifier module 136 is trained based upon such vectors of values.

The classifier module 136 outputs the score, and the crawler module 138 crawls the first webpage 110 when the score exceeds a predefined threshold. Thus, when the score indicates that there is a relatively high likelihood that an arbitrary user of the search engine will select the first webpage 110 if the first page 110 is represented in a ranked list of search results output by a search engine, the crawler module 138 retrieves the first webpage 110 from the first web server 102, extracts information therefrom, and updates the search engine index 124 to include an entry for first webpage 110, where the entry includes information extracted from the first webpage 110. In another example, rather than crawling the first webpage 110 when the score output by the classifier module 136 is above a threshold, the crawler module 138 crawls the first webpage 110 when a score output by the classifier module 136 for the Pth URL is among some top threshold number of scores output by the classifier module 136 for URLs in the list of URLs 122. Subsequent to the search engine index 124 being updated to include the entry for the first webpage 110, the search engine can receive a query from a client computing device operated by a user, and the search engine can return search results based upon the updated index 124 (e.g., the search engine returns a search result that represents the first webpage 110).

While the classifier module 136 has been described as being configured to compute a score that is indicative of a likelihood that an arbitrary user will select the first webpage 110 when included in search results, it is to be understood that the classifier module 136 can be adapted to output scores for the first webpage 110 that are indicative of other likelihoods. In another embodiment, based upon the embedding for the Pth URL 130 output by the embedder module 134, the classifier module 136 is configured to output a score that is indicative of a likelihood that the first webpage 110 includes content that pertains to a particular topic. In such an embodiment, the classifier module 136 is trained based upon training items that include URLs of webpages and topic(s) assigned to the webpages. In yet another embodiment, based upon the embedding for the Pth URL output by the embedder module 134, the classifier module 136 is configured to output a score that is indicative of a likelihood that the first webpage 110 will cause a client computing device to install malware thereon when the client computing device retrieves the first webpage 110. In such an embodiment, the classifier module 136 is trained based upon training items that include URLs of webpages and indications as to whether or not the webpages are associated with malware.

In still yet another embodiment, based upon the embedding for the Pth URL output by the embedder module 134, the classifier module 136 is configured to output a score that is indicative of a likelihood that the first webpage 110 includes a predefined number of outbound links (and thus would be a good "seed" webpage for initiating a search for other webpages). In such an embodiment, the classifier module 136 is trained based upon training items that include URLs of webpages and numbers of outbound links in the webpages. In another embodiment, based upon the embedding for the Pth URL output by the embedder module 134, the classifier module 136 is configured to output a score that is indicative of a likelihood that content of the first webpage 110 has been altered within period of time (e.g., a likelihood that content of the first webpage 110 has changed within the last five days). In this embodiment, the classifier module 136 is trained based upon training items that include URLs of webpages and an amount of time since the webpages were altered. In each of these embodiments, training items are readily available in a search log of a search engine, where a relatively large number of training items (e.g., on the order of millions or billions of training items) can be used to train the classifier module 136.

The technologies described above exhibit various advantages over conventional approaches for ascertaining whether or not to include an entry in a search engine index for a newly discovered webpage. As the computing system 106 is configured to contemplate semantics of URLs, the computing system 106 is able to ascertain whether users of the search engine are likely to select a webpage represented by a URL based upon such semantics, and therefore the computing system 106 need not utilize arbitrary metrics (such as number of identified inbound links, whether the webpage belongs to a particular website, etc.) to decide whether or not to index the webpage. For instance, when the computing system 106 ascertains that the Pth URL 130 includes semantic information that indicates that the first webpage 110 represented by the Pth URL 130 pertains to a product, and historically users select webpages in search results that include information about similar products, then the computing system 106 chooses to index the first webpage 110, as users of the search engine are also likely to select the (newly discovered) first webpage 110.

Figure 2:
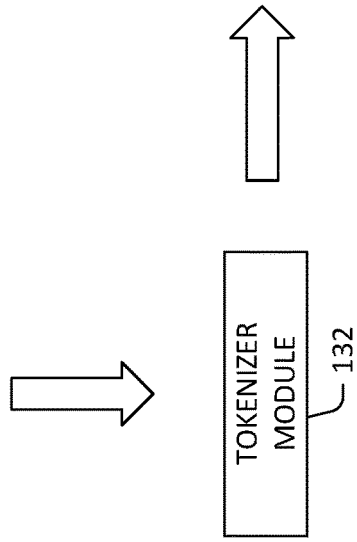
FIG. 2 depicts a transformation of a uniform resource locator (URL) into a sequence of identifiers.

With reference now to FIG. 2, a diagram that depicts operation of the tokenizer module 132 is presented. In an example, the Pth URL 130 is http://www.example.com/ prdcttype/newitm/product.html. Continuing with this example, the tokenizer module 132 breaks the URL into a sequence of 11 separate tokens: "http://www.", "example", ".com/", "prdct", "type", "/", "new", "itm", "/", "product", and ".html". As indicated previously, each of these 11 tokens may be one of a predefined number (e.g., 150,000, 250,000, 500,000, etc.) of tokens that the tokenizer module 132 is configured to identify. The tokenizer module 132 maps the tokens extracted from the Pth URL 130 to respective token identifiers for the tokens. In the example depicted in FIG. 2, the tokenizer module 132 maps the eleven tokens into the sequence of identifiers "5", "25", "676", "2567", "10876", "356", "12567", "165789", "356", "25674", and "213584".

In addition, in the example depicted in FIG. 2, the tokenizer module 132 forms bigrams from the tokens (or from the token identifiers), where the bigrams are "http://www.example", "example.com/", ".com/prdct", "prdct-type", "type/", "/new", "newitm", "itm/", "/product", "product.html", and ".html-null". The tokenizer module 132 then transforms the bigrams into respective bigram identifiers. In an example, the tokenizer module 132 hashes each bigram into one of a predefined number (e.g., 150 million) of bins, where each bin corresponds to a bigram identifier. In FIG. 2, the bigram "http://www.example" is transformed into the bigram identifier 250623, the bigram "example.com" is transformed into the bigram identifier 1345832, and so forth. The output of the tokenizer module 132 is thus a plurality of identifiers that includes the sequence of token identifiers and the sequence of bigram identifiers. The Pth URL is therefore represented by the plurality of identifiers.

Figure 3:
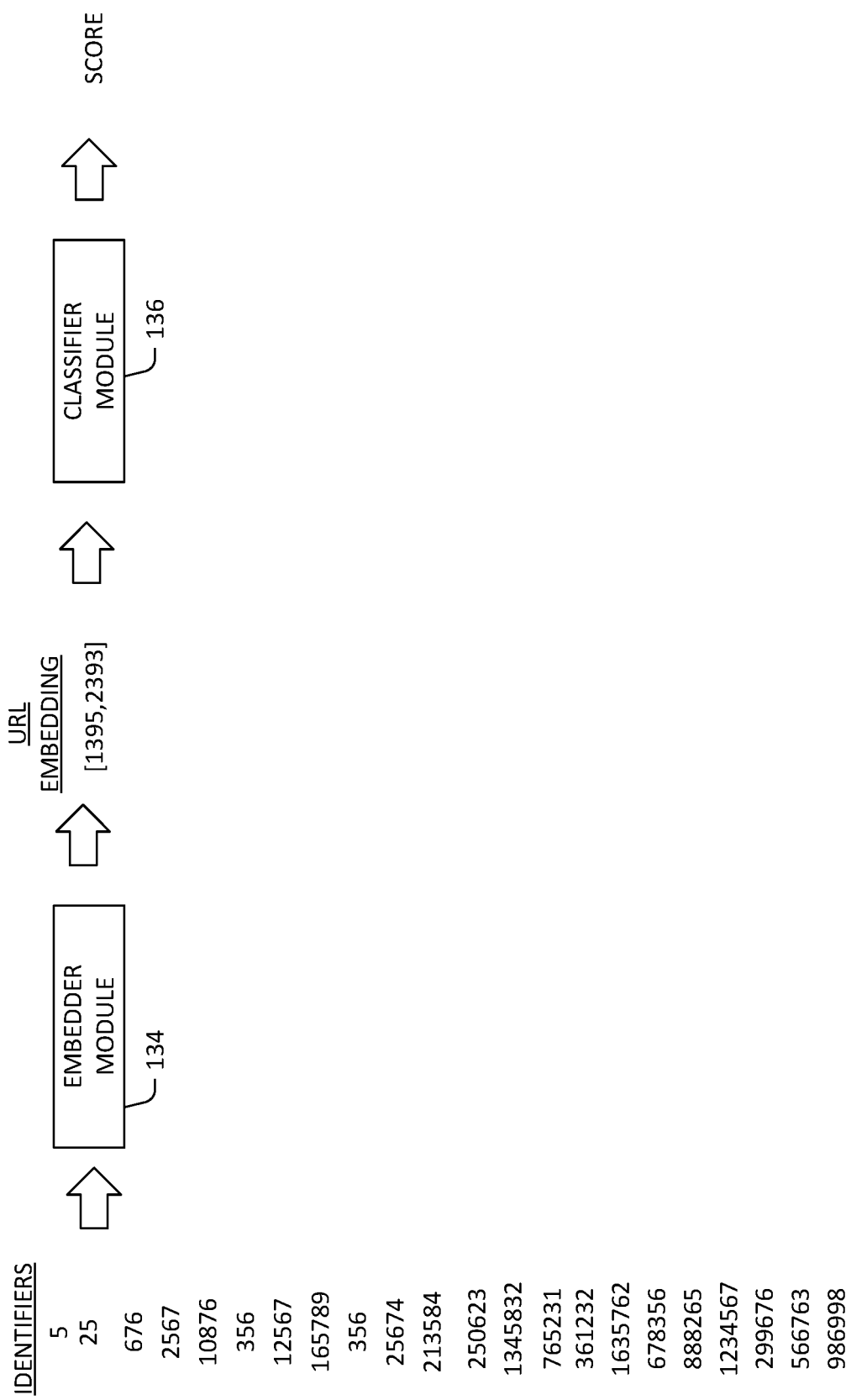
FIG. 3 illustrates word embeddings generated for identifiers in the sequence of identifiers depicted in FIG. 2.

Referring now to FIG. 3, operation of the embedder module 134 is illustrated. The embedder module 134 receives the plurality of identifiers output by the tokenizer module 132, where the plurality of identifiers includes the token identifiers and the bigram identifiers. In an example, the embedder module 134 receives the sequence of token identifiers separately from the sequence of bigram identifiers. In another example, the embedder module 134 includes a first word embedding algorithm and a second word embedding algorithm, where the first word embedding algorithm receives the sequence of token identifiers and the second word embedding algorithm receives the sequence of bigram identifiers. Other arrangements are also contemplated.

The embedder module 134 performs word embedding on the received identifiers and, in the example depicted in FIG. 3, outputs a 2-dimensional vector for each identifier in the sequence of identifiers. In an embodiment, the embedder module 134 forms a 2-dimensional vector for an identifier (either a token identifier or a bigram identifier) based solely upon the identifier. In another example, the embedder module 134 generates a 2-dimensional vector for an identifier based upon the identifier and at least one other identifier that precedes the identifier in the sequence of identifiers and/or at least one other identifier that follows the identifier in the sequence of identifiers. Further, in an example, the embedder module 134 employs an embeddings table to generate the word embeddings for the identifiers. Values of a 2-dimensional vector output by the embedder module 134 for an identifier represent semantic information about the identifier, and thus represent semantic information about the token and/or bigram represented by the identifier. Therefore, when distance between two 2-dimensional vectors is relatively small, semantics of two tokens or bigrams represented by such vectors are similar.

The embedder module 134 generates an embedding for the Pth URL 130 based upon the sequence of 2-dimensional vectors, as described above. In this example, the embedding for the Pth URL is also a 2-dimensional vector, although it is to be understood that the embedding for the Pth URL is a v-dimensional vector, with v being any suitable value. The embedding for the Pth URL is provides as input to the classifier module 136, and the classifier module 136 outputs a score for the Pth URL 130 (and thus for the first webpage 110), where the score is indicative of a likelihood that an arbitrary user of the search engine will select the first webpage 110 when the first webpage is represented in search results shown on a SERP returned by the search engine.

Figure 4:
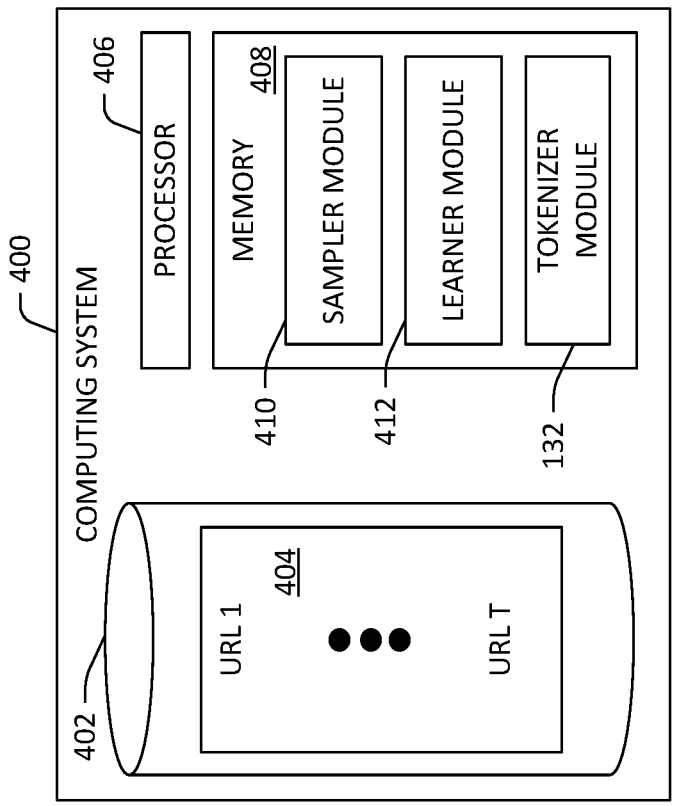
FIG. 4 is a functional block diagram of a computing system that is configured to learn a tokenizer module that is adapted to tokenize URLs.

With reference now to FIG. 4, a functional block diagram of a computing system 400 that is configured to learn the tokenizer module 132 is illustrated. The computing system 400 has a computer-readable data store 402 that includes a list of URLs 404. The list of URLs can include URLs for webpages of which the search engine is aware. Thus, the URLs can include URLs that have a corresponding entry in the search engine index 124 as well as URLs for webpages of which the search engine is aware but do not have a corresponding entry in the search engine index 124. The computing system 400 also includes a processor 406 and memory 408 that stores data that is accessed by the processor 406 and instructions that are executed by the processor 406. The memory 408 has a sampler module 410 loaded therein that selects several URLs from the listing of URLs 404 in the computer-readable data store 402. For instance, the sampler module 410 randomly samples URLs from the list of URLs 404, and therefore the URLs selected by the sampler module 410 may include URLs that have corresponding entries in the search engine index 124, URLs of webpages that have been selected by one or more users of the search engine, URLs that do not have corresponding entries in the search engine index 124, etc. In another example, the sampler module 410 uses a weighted approach when sampling from the list of URLs 404, such that the sampler module 410 is more likely to select URLs of webpages that have been selected by users of the search engine than URLs of webpages that do not have a corresponding entry in the search engine index 124.

The memory 406 also includes a learner module 412 that learns identities of tokens in the URLs sampled from the list of URLs 404 by the sampler module 410, and thus learns the tokenizer module 132. The learner module 412 can learn the tokenizer module 132 based upon a statistical analysis of alphanumerical sequences in the sampled URLs, such that alphanumerical sequences that occur frequently in the sampled URLs are identified as tokens. The learner module 412 learner module 410 is configured to identify a predefined number of tokens in the URLs. As noted previously, in an example, the learner module 412 is configured to identify 250,000 tokens, such that the vocabulary of the tokenizer module 132 is 250,000.

Figure 5:
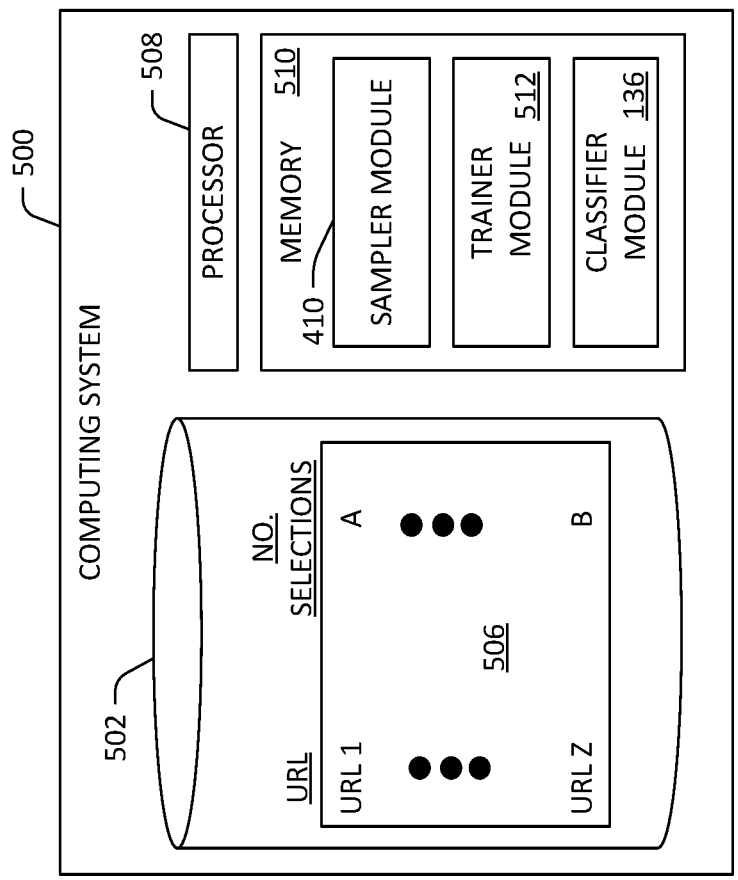
FIG. 5 is a functional block diagram of a computing system that is configured to learn a classifier module that is adapted to compute a score for a webpage based upon a URL of the webpage.

Now referring to FIG. 5, a functional block diagram of a computing system 500 that is configured to train the classifier module 136 is illustrated. While the system 500 is illustrated as being separate from the system 400, it is to be understood that the system 400 can be configured to train the classifier module 136. The computing system 500 includes a computer-readable data store 502, where the data store 502 stores a database 506 that includes URLs of webpages of which the search engine is aware and a number of times that such webpages have been selected by users if and when the webpages were provides as search results on SERPs generated by the search engine. Since several of the URLs do not have a corresponding entry in the search engine index 124, the number of selections of webpages corresponding to such URLs is zero. Further, in the database 506, the number of selections of the webpages corresponding to the URLs can be within some predefined time window, such as within a most recent two months.

The computing system 500 includes a processor 508 and memory 510 that includes data that is accessed by the processor 508 and instructions that are executed by the processor 508. The memory 510 includes the sampler module 410 that samples URLs from the database 506. In an example, the sampler module 410 initially samples from URLs that represent webpages with selections from the database 506, thereby obtaining a set of positive training items. The sampler module 410 subsequently samples from URLs that represent webpages without selections from the database 506, thereby obtaining a set of negative training items. In an embodiment, the sampler module 410 considers a number of selections when sampling from the database 506 when obtaining the positive training items, such that URLs associated with a higher number of selections are more likely to be sampled from the database 506 by the sampler module 410 than URLs associated with a low number of selections. In another example, the sampler module 408 uniformly samples from the URLs having selections corresponding thereto without considering numbers of selections associated with such URLs. Pursuant to an example, the sampler module 410 samples hundreds of millions to billions of training items (e.g., URLs and indications as to whether webpages corresponding to the URLs have been clicked) from the database 506.

The memory 510 further includes a trainer module 512 that trains the classifier module 136 based upon the training items sampled from the database 506 by the sampler module 410. With more specificity, each of the URLs sampled from the database 506 by the sampler module 410 is tokenized by the tokenizer module 132, and the embedder module 134 outputs embeddings for the URLs based upon tokens generated by the tokenizer module 132. Accordingly, each sampled URL from the database 506 is transformed into a sequence of identifiers by the tokenizer module 132, and the embedder module 134 generates an embedding for the URL based upon the sequence of identifiers. The trainer module 512 receives, for each sampled URL, an embedding for the URL that represent semantics of the URL and a label indicating whether or not a webpage pointed to by the URL was selected by one or more users of the search engine. Optionally, the trainer module 512 receives, for each sampled URL, an indication of a number of times that a webpage pointed to by the URL was selected by one or more uses of the search engine, such that semantics of URLs associated with a high number of selections are weighted more heavily when the trainer module 512 trains the classifier module 136 than semantics of URLs associated with a low number of selections.

The trainer module 512 uses any suitable supervised learning approach in connection with training the classifier module 136, which in this example acts as a computer-implemented binary classifier. For instance, the trainer module 512 employs backpropagation when training the classifier module 136. It is to be understood, however, that when the classifier module 136 is trained for a different feature (such as topic), the classifier module 136 may be a multi-class classifier. In an example, when the classifier module 136 is trained to identify topics in content of webpages, the classifier module 136 can be trained to generate outputs that are indicative of likelihoods that webpages include content that is germane to any of ten different topics.

While the database 506 illustrates inclusion of URLs and corresponding numbers of selections, the database 506 may also include URLs and one or more topics assigned to webpages pointed to by the URLs, may further include an indicator as to whether webpages are associated with malware, may include indications of number if inbound and/or outbound links in the webpages, may include an indication as to how often the webpages were included within a top X number of search results by the search engine, may include values that indicate when the webpages were most recently altered, and so forth. Such information is typically found in a search log of a search engine, and the information can be employed to train the classifier module 136 depending on information about webpages that is desirably inferred.

Pursuant to an example, the classifier module 136 is trained periodically (e.g., every three days), and is trained based upon data in the database 506 that is fairly recent (e.g., within the last two months). This allows the classifier module 136 to adapt to changes in human behavior. For example, when a newsworthy event occurs, such as an unexpected earthquake, users of a search engine may select webpages that include content about earthquakes; however, two weeks prior to the earthquake, content about earthquakes may not have been of interest to most users. By retraining the classifier module 136 periodically and based upon recent data, the scores output by the classifier module 136 is reflective of recent behavior of users of the search engine.

Figure 6:
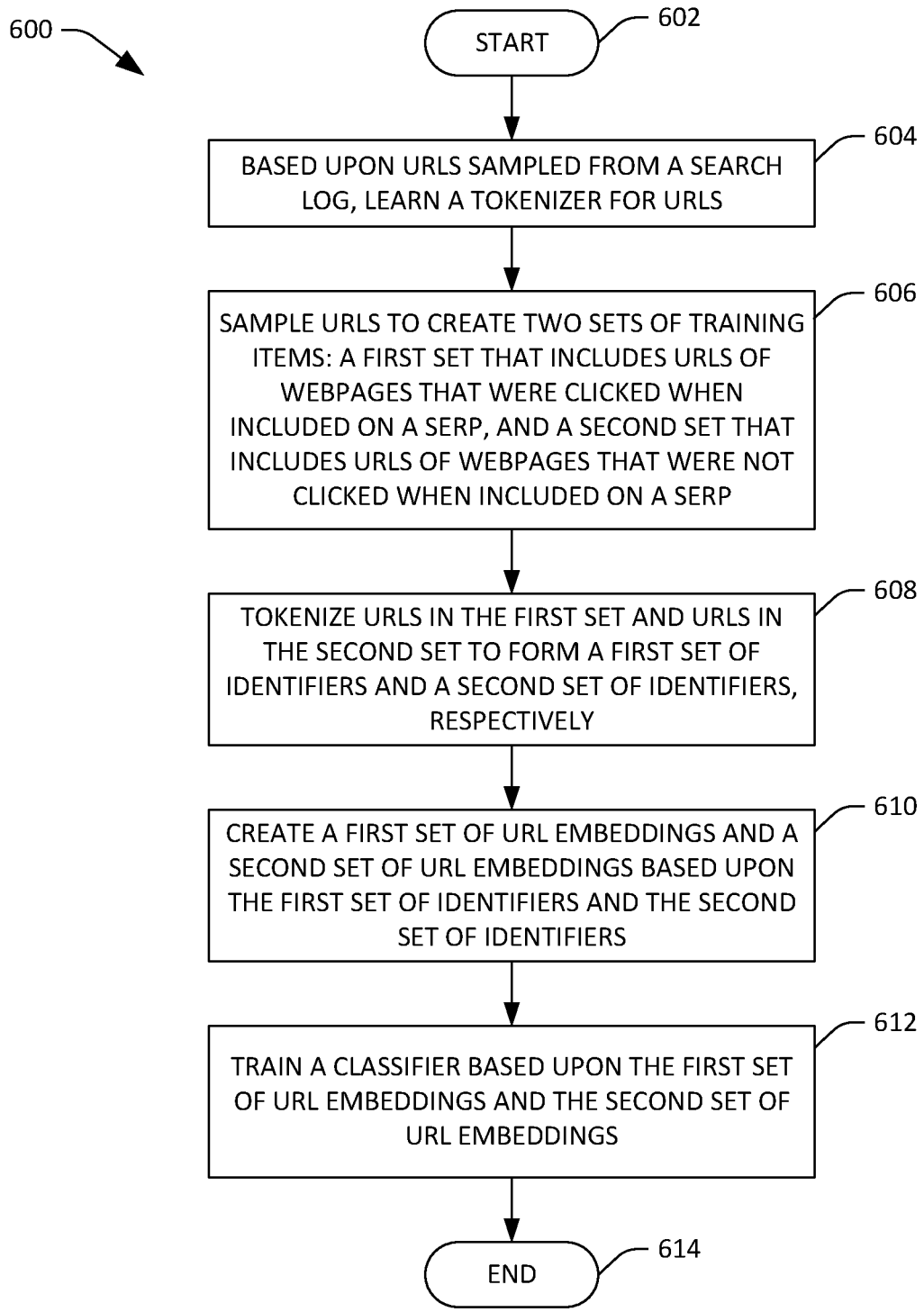
FIG. 6 illustrates a methodology for training a classifier, where the classifier, when trained, is configured to output a score for a webpage based upon a URL of the webpage.
Figure 7:
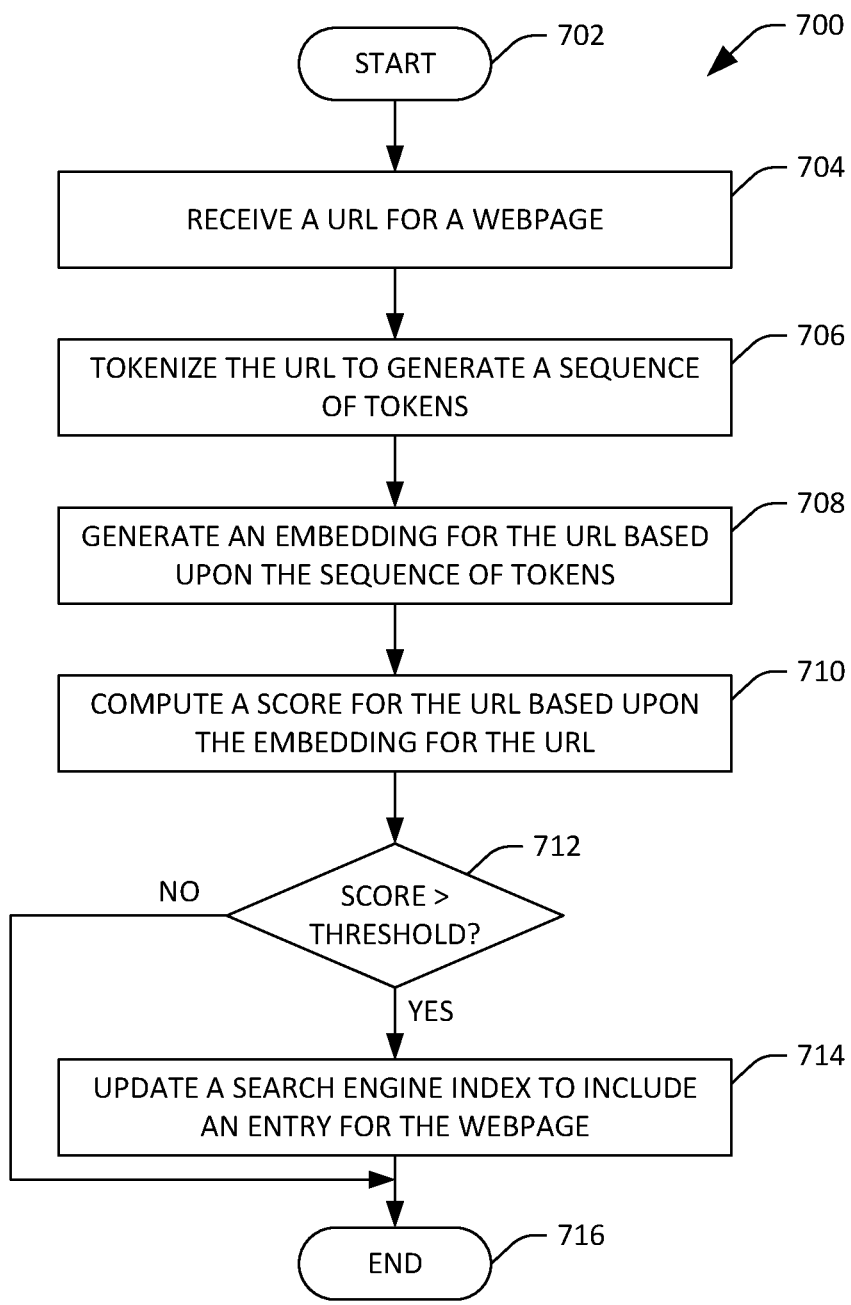
FIG. 7 illustrates a methodology for updating a search engine index based upon a score computed for a webpage, where the score is computed based upon a URL of the webpage.

FIGS. 6 and 7 illustrate methodologies relating to inferring information about webpages based upon URLs of the webpages. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring solely to FIG. 6, a flow diagram illustrating a methodology for training the classifier module for 136 is illustrated. The methodology 600 starts at 602, and at 604, based upon URLs sampled from a search log of a search engine, a tokenizer designed to tokenize URLs is learned. At 606, from the search log, URLs are sampled to create two sets of training items: a first set of training items that includes URLs of webpages that were clicked when included on SERPs presented to users of the search engine; and 2) a second set of training items that includes URLs of webpages that were not clicked by users of a search engine. At 608, the tokenizer learned at 604 is employed to tokenize URLs in the first set of training items and URLs in the second set of training items to form a first set of identifiers and a second set of identifiers.

At 610, a first set of URL embeddings is based upon the first set of identifiers and a second set of URL embeddings are created based upon the second set of identifiers. As indicated previously, these URL embeddings represent semantics of URLs. At 612, the classifier module 136 is trained based upon the first set of URL embeddings and the second set of URL embeddings. The methodology 600 completes at 614.

Now referring to FIG. 7, a flow diagram illustrating a methodology 700 for updating a search engine index is illustrated. The methodology 700 starts at 702, and at 704 a URL is received for a webpage. In an example, there is no entry for the webpage in a search engine index of a search engine. At 706, the URL is tokenized to generate a sequence of tokens. At 708, an embedding for the URL are generated based upon the sequence of tokens. At 710, a score for the URL is computed based upon the embedding for the URL generated at 708. At 712, a determination is made as to whether the score is greater than a threshold. When the score is greater than the threshold, at 714 a search engine index is updated to include an entry for the webpage. For instance, a crawler retrieves the webpage, extracts information from the webpage, and updates the search engine index based upon the information extracted from the webpage. The methodology 700 ends at 716 when it is determined at 712 that the score is not greater than the threshold or subsequent to the search engine index being updated at 714.

Figure 8:
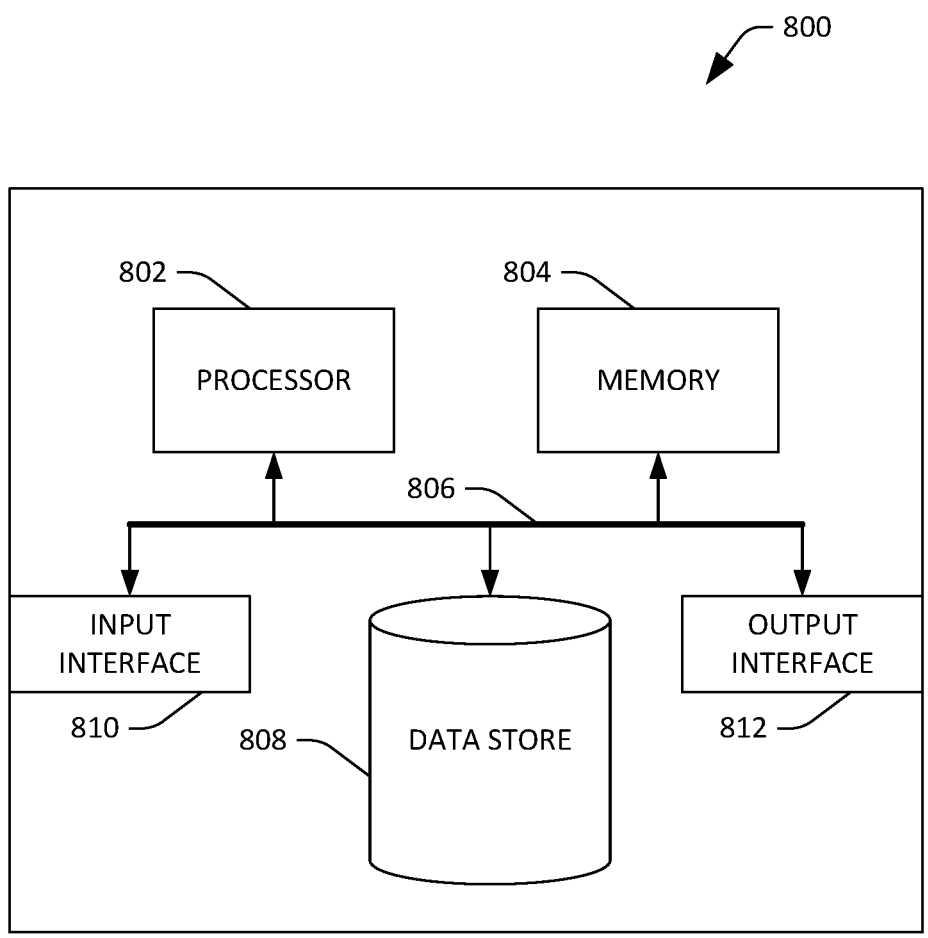
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that infers information about a webpage based upon semantics of a URL of the webpage. By way of another example, the computing device 800 can be used in a system that trains a classifier module to output scores that are indicative of whether or not a webpage has a particular feature. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store URLs, numbers of selections of URLs, tokens of URLs, etc.

The computing device 800 additionally includes a data store 808 that is accessible by the processor 802 by way of the system bus 806. The data store 808 may include executable instructions, a search engine log, tokens, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can be or include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The features described herein relate to inferring information about webpages based upon semantic information extracted from URLs of the webpages, according to at least the examples provided below.

(A1) In one aspect, some embodiments include a method executed by at least one processor (e.g., 126) of a computing system (e.g., 106), where the method comprises acts that include: retrieving a URL (e.g., 130) for a webpage (e.g., 110) from a list (e.g., 122) of URLs for webpages, wherein the webpage is included in the World Wide Web; creating, based upon the URL, a vector of values that represents semantics existent in alphanumerical characters of the URL; inferring information about the webpage based upon the vector; based upon the information inferred about the webpage, retrieving the webpage from a computing device that hosts the webpage; and upon retrieving the webpage, extracting content from the webpage and storing the extracted content in computer-readable storage.

(A2) In some embodiments of the method of A1, the information is a likelihood that the webpage will be selected by an arbitrary user of a search engine when the webpage is included in a SERP provided to the arbitrary user by the search engine.

(A3) In some embodiments of the method of A2, the extracted content from the webpage is included in a search engine index of the search engine.

(A4) In some embodiments of any of the method of A1, the information is a likelihood that the webpage includes content that belongs to a predefined topic.

(A5) In some embodiments of the method of A1, the information is a likelihood that content of the webpage has been updated within a threshold amount of time.

(A6) In some embodiments of the method of A1, the information is a likelihood that content of the webpage is written in a particular language.

(A7) In some embodiments of the method of A1, the information is a likelihood that the webpage is associated with malware.

(A8) In some embodiments of any of the methods of A1-A7, creating the vector of values that represents semantics existent in the alphanumerical characters of the URL comprises: tokenizing the URL to extract tokens from the URL; mapping the extracted tokens to respective identifiers; generating n-grams from the extracted tokens, wherein each n-gram includes several tokens; and using word embedding, and based upon the n-grams, generating s-dimensional vectors for the n-grams, wherein the s-dimensional vectors represent semantics of the n-grams.

(A9) In some embodiments of the method of A8, the s-dimensional vectors are 2-dimensional vectors.

(B1) In another aspect, some embodiments include a method performed by a computing system (e.g., 106) that includes a processor (e.g., 126) and memory (e.g., 128). The method includes tokenizing a URL (e.g., 130) for a webpage (e.g., 110) to generate tokens of the URL. The method also includes generating an embedding for the URL based upon the generated tokens, wherein the embedding for the URL represents semantics of the URL. The method further includes based upon the embedding for the URL, computing a score for the URL, wherein the score is indicative of a likelihood that a user will select a search result that represents the webpage when the search result is included on a SERP generated by a search engine, wherein a search engine index for the search engine is updated based upon a determination being made that the score is greater than a threshold.

(B2) In some embodiments of the method of B1, the score for the URL is output by a computer-implemented binary classifier.

(B3) In some embodiments of the method of B2, the computer-implemented binary classifier is trained based upon content of a search log of a search engine, wherein training data for training the binary classifier includes URLs in the search log of the search engine and indications as to whether search results corresponding to the URLs were selected by users of the search engine.

(B4) In some embodiments of any of the methods of B1-B3, the method further includes when the score is less than or equal to the threshold, failing to include the entry for the webpage in the search engine index for the search engine.

(B5) In some embodiments of any of the methods of B1-B4, the method further includes mapping the generated tokens to respective identifiers, wherein the embedding for the URL is generated based upon the identifiers mapped to the generated tokens.

(B6) In some embodiments of any of the methods of B1-B5, generating the embedding for the URL includes generating word embeddings based upon the tokens, wherein each word embedding in the word embeddings is a two-dimensional vector.

(B7) In some embodiments of any of the methods of B1-B6, the method further includes subsequent to tokenizing the URL, generating n-grams based upon the tokens, wherein the embedding for the URL is generated based upon the generated n-grams.

(B8) In some embodiments of any of the methods of B1-B7, tokenizing the URL is performed by a tokenizer that is trained based upon a set of known URLs.

(B9) In some embodiments of any of the methods of B1-B8, the method further includes: based upon the embedding for the URL, computing a second score for the URL, wherein the second score is indicative of a likelihood that the webpage includes a threshold number of outbound links.

(B10) In some embodiments of any of the methods of B1-B9, the method further includes: based upon the embedding for the URL, computing a second score for the URL, wherein the second score is indicative of a likelihood that the webpage includes content that is germane to a topic.

(C1) In another aspect, some embodiments include a method performed by a computing system (e.g., 106) that includes a processor (e.g., 126) and memory (e.g., 128). The method includes tokenizing a URL (e.g., 130) of a webpage (e.g., 110) to generate tokens of the URL; generating an embedding for the URL based upon the generated tokens, wherein the embedding for the URL represents semantics of the URL; based upon the embedding for the URL, computing a score for the URL, wherein the score is indicative of a likelihood that a user will select a search result that represents the webpage when the search result is included on a SERP generated by a search engine; and in accordance with the score being greater than a threshold, updating a search engine index for the search engine to include an entry for the webpage.

(D1) In another aspect, some embodiments include a computing system (e.g., 106) that includes a processor (e.g., 126) and memory (e.g., 128), where the memory includes instructions that, when executed by the processor, cause the processor to perform any of the methods described herein (e.g., any of A1-A9, B1-B10, and/or C1).

(E1) In yet another aspect, a computer-readable storage medium includes instructions that, when executed by a processor (e.g., 126) of a computing system (e.g., 106), cause the processor to perform any of the methods described herein (e.g., any of A1-A9, B1-B10, and/or C1).

The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
a processor; and
memory storing instructions that, when executed by the processor, cause the processor to perform acts comprising:
tokenizing a uniform resource locator (URL) for a webpage to generate tokens of the URL;
generating an embedding for the URL based upon the generated tokens, wherein the embedding for the URL represents semantics of the URL, and further wherein generating the embedding for the URL comprises:
mapping the tokens to respective token identifiers for the tokens;
forming n-grams based upon the token identifiers, where each n-gram includes n token identifiers; and
generating first embeddings for the token identifiers and second embeddings for the n-grams, where the embedding for the URL is based upon the first embeddings and the second embeddings; and
based upon the embedding for the URL, computing a score for the URL, wherein the score is indicative of a likelihood that a user will select a search result that represents the webpage when the search result is included on a search engine results page (SERP) generated by a search engine, wherein a search engine index for the search engine is updated based upon a determination being made that the score is greater than a threshold.

2. The computing system of claim 1, wherein the score for the URL is output by a computer-implemented binary classifier.

3. The computing system of claim 2, wherein the computer-implemented binary classifier is trained based upon content of a search log of a search engine, wherein training data for training the binary classifier includes URLs in the search log of the search engine and indications as to whether search results corresponding to the URLs were selected by users of the search engine.

4. The computing system of claim 1, the acts further comprising: when the score is less than or equal to the threshold, failing to include the entry for the webpage in the search engine index for the search engine.

5. The computing system of claim 1, wherein tokenizing the URL is performed by a tokenizer that is trained based upon a set of known URLs.

6. The computing system of claim 1, the acts further comprising:
based upon the embedding for the URL, computing a second score for the URL, wherein the second score is indicative of a likelihood that the webpage includes a threshold number of outbound links.

7. The computing system of claim 1, the acts further comprising:
based upon the embedding for the URL, computing a second score for the URL, wherein the second score is indicative of a likelihood that the webpage includes content that is germane to a topic.

8. The computing system of claim 1, where the score for the webpage is computed without retrieving the webpage.

9. A method executed by at least one processor of a computing system, the method comprising:
retrieving a uniform resource locator (URL) for a webpage from a list of URLs for webpages, wherein the webpage is included in the World Wide Web;
tokenizing the uniform resource locator (URL) for the webpage to Generate tokens of the URL;
creating, based upon the URL, a vector of values that represents semantics existent in alphanumerical characters of the URL, where creating the vector of values comprises:
mapping the tokens to respective token identifiers for the tokens;
forming n-grams based upon the token identifiers, where each n-gram includes n token identifiers; and
generating first embeddings for the token identifiers and second embeddings for the n-crams, where the vector of values is based upon the first embeddings and the second embeddings;
inferring information about the webpage based upon the vector;
based upon the information inferred about the webpage, retrieving the webpage from a computing device that hosts the webpage; and
upon retrieving the webpage, extracting content from the webpage and storing the extracted content in computer-readable storage.

10. The method of claim 9, wherein the extracted content from the webpage is included in a search engine index of the search engine.

11. The method of claim 9, wherein the information comprises a likelihood that the webpage includes content that belongs to a predefined topic.

12. The method of claim 9, wherein the information comprises a likelihood that content of the webpage has been updated within a threshold amount of time.

13. The method of claim 9, wherein the information comprises a likelihood that content of the webpage is written in a particular language.

14. The method of claim 9, wherein the information comprises a likelihood that the webpage is associated with malware.

15. The method of claim 9, wherein the information comprises a likelihood that the webpage will be selected by an arbitrary user of a search engine when the webpage is included in a search engine results page (SERP) provided to the arbitrary user by the search engine.

16. A computer-readable storage medium comprising instructions that, when executed by at least one processor, cause the at least one processor to perform acts comprising:
   tokenizing a uniform resource locator (URL) of a webpage to generate tokens of the URL;
   generating an embedding for the URL based upon the generated tokens, wherein the embedding for the URL represents semantics of the URL, and further wherein generating the embedding for the URL comprises:
   mapping the tokens to respective token identifiers for the tokens;
   forming n-grams based upon the token identifiers, where each n-gram includes n token identifiers; and
   generating first embeddings for the token identifiers and second embeddings for the n-crams, where the embedding for the URL is based upon the first embeddings and the second embeddings;
      based upon the embedding for the URL, computing a score for the URL, wherein the score is indicative of a likelihood that a user will select a search result that represents the webpage when the search result is included on a search engine results page (SERP) generated by a search engine; and
      in accordance with the score being greater than a threshold, updating a search engine index for the search engine to include an entry for the webpage.

17. The computer-readable storage medium of claim 16, the acts further comprising:
   based upon the embedding for the URL, computing a second score for the URL, where the second score is indicative of a likelihood that the webpage includes content that belongs to a predefined topic, and further wherein the search engine index is updated based upon the second score for the URL.

18. The computer-readable storage medium of claim 16, the acts further comprising:
   based upon the embedding for the URL, computing a second score for the URL, where the second score is indicative of a likelihood that content of the webpage has been updated within a threshold amount of time, and further wherein the search engine index is updated based upon the second score for the URL.

19. The computer-readable storage medium of claim 16, the acts further comprising:
   based upon the embedding for the URL, computing a second score for the URL, where the second score is indicative of a likelihood that content of the webpage is written in a particular language, and further wherein the search engine index is updated based upon the second score for the URL.

20. The computer-readable storage medium of claim 16, where the score for the webpage is computed without retrieving the webpage.

* * * * *